United States Patent
L'Hostis et al.

(10) Patent No.: US 6,521,587 B1
(45) Date of Patent: Feb. 18, 2003

(54) SILICONE FOAM CONTROL AGENT

(75) Inventors: Jacqueline L'Hostis, Hellebecq (BE); Franck Renauld, Gistoux (BE); George Sawicki, Penarth (GB)

(73) Assignee: Dow Corning S.A., Seneffe (BE)

( * ) Notice: Subject to any disclaimer, the term of this patent is extended or adjusted under 35 U.S.C. 154(b) by 84 days.

This patent is subject to a terminal disclaimer.

(21) Appl. No.: 09/637,893

(22) Filed: Aug. 11, 2000

(30) Foreign Application Priority Data

Aug. 13, 1999 (GB) .............................. 9919087
Jan. 6, 2000 (GB) .............................. 0000132

(51) Int. Cl.$^7$ .............................. B01D 19/04; C11D 3/20
(52) U.S. Cl. .............. 510/466; 516/118; 516/120; 516/121; 510/347; 510/349; 510/361; 510/377; 510/507
(58) Field of Search .............................. 516/117, 118, 516/120, 121; 510/347, 349, 361, 377, 466, 507

(56) References Cited

U.S. PATENT DOCUMENTS

| | | | | |
|---|---|---|---|---|
| 3,383,327 A | * | 5/1968 | Sullivan | 516/117 |
| 3,666,681 A | | 5/1972 | Keil | 516/117 |
| 3,843,558 A | * | 10/1974 | Farminer et al. | 510/347 |
| 4,075,118 A | | 2/1978 | Gault et al. | 510/340 |
| 4,396,524 A | * | 8/1983 | Hempel et al. | 510/347 |
| 4,639,489 A | * | 1/1987 | Aizawa et al. | 516/123 |
| 4,741,861 A | | 5/1988 | Okada et al. | 516/118 |
| 4,978,471 A | * | 12/1990 | Starch | 510/347 |
| 5,380,464 A | * | 1/1995 | McGee et al. | 516/118 |
| 5,486,306 A | * | 1/1996 | L'Hostis et al. | 510/347 |
| 5,612,410 A | | 3/1997 | Kondo et al. | 516/119 |
| 5,648,327 A | | 7/1997 | Smerznak et al. | 510/340 |
| 5,767,053 A | | 6/1998 | Germain et al. | 516/120 |
| 5,824,739 A | | 10/1998 | Kondo et al. | 516/120 |
| 5,866,041 A | * | 2/1999 | Svarz et al. | 516/11 |
| 5,908,891 A | | 6/1999 | Fey et al. | 524/493 |
| 6,136,917 A | | 10/2000 | Christiano et al. | 516/23 |
| 6,369,022 B2 | * | 4/2002 | Hoogland et al. | 510/347 |

FOREIGN PATENT DOCUMENTS

| | | | | |
|---|---|---|---|---|
| EP | 0013028 A1 | 7/1980 | | C11D/3/08 |
| EP | 0040091 A1 | 11/1981 | | C11D/17/00 |
| EP | 0071481 A1 | 2/1983 | | C11D/3/00 |
| EP | 0142910 A1 | 5/1985 | | C11D/3/00 |
| EP | 0206522 A2 | 12/1986 | | C11D/3/00 |
| EP | 0210721 A2 | 2/1987 | | C11D/3/37 |
| EP | 0217501 A2 | 4/1987 | | B01D/19/04 |
| EP | 0329842 A2 | 8/1989 | | C11D/3/12 |
| EP | 0336710 A1 | 10/1989 | | C11D/3/00 |
| EP | 0414221 A2 | 2/1991 | | C11D/3/37 |
| EP | 0459512 A2 | 12/1991 | | B01D/19/04 |
| EP | 0484081 A2 | 5/1992 | | C11D/3/37 |
| EP | 0 499 364 A1 | * | 8/1992 | |
| EP | 0636684 A2 | 2/1995 | | C11D/3/12 |
| EP | 0636685 A2 | 2/1995 | | C11D/3/12 |
| EP | 0638346 A2 | 2/1995 | | B01D/19/04 |
| EP | 0663225 A1 | 7/1995 | | B01D/19/04 |
| EP | 0718018 A2 | 6/1996 | | B01D/19/04 |
| EP | 0723795 A2 | 7/1996 | | B01D/19/04 |
| EP | 0831145 A2 | 3/1998 | | C11D/3/37 |
| EP | 0913187 A2 | 5/1999 | | B01F/5/02 |
| EP | 0995473 A1 | 4/2000 | | B01D/19/04 |
| EP | 0997180 A1 | 5/2000 | | B01D/19/04 |
| GB | 1224026 | 3/1971 | | C08G/47/02 |
| GB | 1407997 | 10/1975 | | C11D/10/00 |
| GB | 1492939 | 11/1977 | | C11D/10/02 |
| GB | 1523957 | 9/1978 | | C11D/17/00 |
| GB | 2009223 A | 6/1979 | | C11D/3/37 |
| GB | 2257709 A | 1/1993 | | C08L/83/04 |
| GB | 2315757 A | 2/1998 | | C08L/83/04 |
| JP | 56139107 A | 10/1981 | | B01D/19/04 |
| WO | WO92/13056 A1 | 8/1992 | | C11D/3/08 |
| WO | WO92/20770 A1 | 11/1992 | | C11D/3/37 |
| WO | WO92/22630 A1 | 12/1992 | | C11D/7/14 |
| WO | WO93/01269 A1 | 1/1993 | | C11D/3/37 |
| WO | WO93/11752 A1 | 6/1993 | | A61K/9/28 |
| WO | WO95/04124 A1 | 2/1995 | | C11D/3/00 |
| WO | WO96/06919 A1 | 3/1996 | | C11D/17/00 |
| WO | WO96/06921 A1 | 3/1996 | | C11D/17/00 |
| WO | WO96/34671 A1 | 11/1996 | | B01D/19/04 |
| WO | WO98/00216 A1 | 1/1998 | | B01D/19/04 |
| WO | WO98/09701 A1 | 3/1998 | | C11D/19/04 |
| WO | WO98/22196 A1 | 5/1998 | | B01D/19/04 |
| WO | WO99/29816 A1 | 6/1999 | | C11D/3/00 |
| WO | WO99/67354 A1 | 12/1999 | | C11D/11/00 |
| WO | WO00/11126 A1 | 3/2000 | | C11D/3/37 |
| WO | WO00/11127 A1 | 3/2000 | | C11D/3/37 |

OTHER PUBLICATIONS

Shin–Etsu, Self–Emulsifying Antifoam, Chemical Abstracts, vol. 96, p. 124, 96:54317 (1982). Month unknown.

* cited by examiner

*Primary Examiner*—Daniel S. Metzmaier
(74) *Attorney, Agent, or Firm*—Reising, Ethington, Barnes, Kisselle, Learman & McCulloch, P.C.

(57) ABSTRACT

A foam control agent, comprising (A) an organopolysiloxane material having at least one silicon-bonded substituent of the formula X-Ph, wherein X denotes a divalent aliphatic organic group bonded to silicon through a carbon atom and Ph denotes an optionally substituted aromatic group, (B) a water-insoluble organic fluid, (C) an organosilicon resin and (D) a hydrophobic filler. The foam control agent may be provided as an emulsion or as a particulate material. It is especially useful as a detergent foam control agent.

26 Claims, No Drawings

SILICONE FOAM CONTROL AGENT

FIELD OF THE INVENTION

This invention is concerned with silicone-based foam control agents, particularly for use in aqueous compositions, preferably detergent compositions.

In many aqueous systems which are used e.g. in food processes, textile dying, paper production, sewage treatment and cleaning applications, surface active agents are present either as an unwanted ingredient or as deliberately introduced materials to achieve a certain function. Due to the presence of these surface active agents foam is often generated. In certain applications, such as in dish washing by hand, this is a welcome effect but in other applications foam generation can lead to unsatisfactory results. This is for example the case in the dyeing of textiles or in the manufacture of paper. In other applications, for example the use of detergent compositions for domestic laundering, the production of foam needs to be controlled rather than avoided. It is important to keep the foam formation to an acceptable level when laundering is performed in automatic washing machines, especially front loading machines. Excessive foam would cause overflow of the washing liquor onto the floor as well as reduction in the efficiency of the laundering operation itself.

BACKGROUND OF THE INVENTION

Silicone-based foam control agents are known and have been incorporated into for example heavy duty detergent powders and liquids for use in automatic washing machines. Silicone foam control agents are regarded as very effective in this application as they can be added in very small quantities and are not affected by e.g. the hardness of water, while traditional foam control compositions, such as soaps, require a certain water hardness for their effectiveness. However, they are usually not cheap, and there is a need to find ways to cheapen such formulations without compromising the cost-efficiency of the foam control agents.

In addition, the detergent industry is constantly going through an evolution where, due to environmental concerns, energy conservation efforts, machine design changes, water conservation and changing laundering habits there is a move towards the use of detergent compositions which will perform to a higher efficiency than hitherto. There is a need to control foam from e.g. increased surfactant levels in the detergent compositions, use of surfactants which have a higher foam profile than traditional surfactants and changing laundering conditions. Since silicone foam control agents do not directly contribute to the cleaning power of a detergent composition it is desirable to keep the addition level of such foam control agents to a minimum. There has therefore arisen a need to develop improved foam control agents for incorporation into detergent compositions.

Silicone foam control agents are mostly based on organopolysiloxane materials, which may be linear or branched, and which may contain a variety of silicon-bonded substituents. EP 217501 describes a foam control agent wherein a liquid siloxane component is obtained by mixing 100 parts by weight of a polydiorganosiloxane having triorganosiloxane end-groups, 10 to 125 parts of a polydiorganosiloxane having at least one terminal silanol group and at least 40 silicon atoms and 0.5 to 10 parts of an organopolysiloxane resin comprising monofunctional and tetrafunctional siloxane units in a ratio of from 0.5:1 to 1.2:1, and having at least one silanol group per molecule, and there-after heating the mixture. The specification describes the need to control the amount of resin used in order to retain a liquid polymer, avoiding a gel structure. This indicates that some branching occurs in the siloxane component of the foam control agent.

JP-A-56-139107 describes a self-emulsifying antifoaming agent comprising an organopolysiloxane oxyalkylene copolymer of the formula

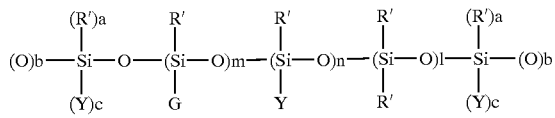

where G is an oxyalkylene group; Y is —CH2CHR"—R5-D or —CH2CHR"COOR", where R" is H or alkyl, R5 is divalent hydrocarbon, for example ethylene, propylene, butylene, phenylene or phenethylene, and D is H or OH; a, b and c are each 0,1,2 or 3 and a+b+c=3.

GB 2257709 describes a foam control agent which is particularly useful when incorporated in detergent compositions where a high level of high foaming surfactants is present, and comprises a branched polydiorganosiloxane which is prepared through hydrosilylation.

GB 1224026 describes an antifoaming agent which is composed of 10 parts by weight of certain water-insoluble organic liquids and from 0.1 to 5.0 parts by weight of an organopolysiloxane which is compatible in the organic liquid and consists essentially of monovalent and tetravalent siloxane units. U.S. Pat. No. 3,666,681 describes an antifoaming agent for aqueous systems consisting essentially of a mixture of 100 parts by weight of certain water-insoluble organic liquids, from 0.5 to 10.0 parts by weight of an organopolysiloxane, which may be a fluid or a resinous compound, and from 0.5 to 10.0 parts by weight of a filler which is selected from finely divided silica and methylsilsesquioxane gel, and from 0.002 to 5.0 parts by weight of a compound which is selected from ammonia, a disilazane and an alkali or alkaline earth metal hydroxide.

SUMMARY OF THE INVENTION

There is still a need to provide more efficient foam control agents. We have now found that if organopolysiloxane materials with certain aromatic substituents are combined with water-insoluble organic liquids in the presence of certain organosilicon resins and fillers, a more efficient foam control is obtained.

A foam control agent according to the invention comprises (A) an organopolysiloxane material having at least one silicon-bonded substituent of the formula X—Ph, wherein X denotes a divalent aliphatic hydrocarbon group and Ph denotes an aromatic group, (B) a water-insoluble organic fluid, (C) an organosilicon resin and (D) a hydrophobic filler.

DETAILED DESCRIPTION OF THE INVENTION

The organopolysiloxane material (A) is preferably a fluid and is preferably a polydiorganosiloxane. The aromatic group Ph can be unsubstituted or substituted. (A) preferably comprises diorganosiloxane units of the formula

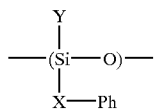

where Y is an alkyl group having 1 to 4 carbon atoms, preferably methyl. These diorganosiloxane units containing a —X—Ph group may comprise substantially all or a majority of the diorganosiloxane units in (A), but preferably comprise up to 50%, most preferably 5 to 40%, of the diorganosiloxane units in (A). The group X is preferably a divalent alkylene group having from 2 to 10 carbon atoms, most preferably 2 to 4 carbon atoms, but can alternatively contain an ether linkage between two alkylene groups or between an alkylene group and —Ph, or can contain an ester linkage. Ph is preferably a moiety containing at least one aromatic ring —$C_6R_5$, wherein each R independently denotes hydrogen, halogen, hydroxyl, an alkoxy group having 1 to 6 carbon atoms or a monovalent hydrocarbon group having 1 to 12 carbon atoms, or wherein two or more R groups together represent a divalent hydrocarbon group. Ph is most preferably a phenyl group, but may be substituted for example by one or more methyl, methoxy, hydroxy or chloro group, or two substituents R may together form a divalent alkylene group, or may together form an aromatic ring, resulting in conjunction with the Ph group in e.g. a naphthalene group. A particularly preferred X—Ph group is 2-phenylpropyl —$CH_2$—$CH(CH_3)$—$C_6H_5$. Alternatively —Ph can be a heterocyclic group of aromatic character such as thiophene, pyridine or quinoxaline.

The polydiorganosiloxane (A) also preferably comprises at least 50% diorganosiloxane units of the formula

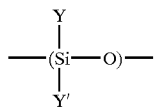

where Y' is an aliphatic hydrocarbon group having 1 to 24 carbon atoms, preferably 1 to 6 carbon atoms, for example ethyl, methyl, propyl, isobutyl, hexyl, vinyl or lauryl, or a cycloalkyl group such as cyclohexylethyl. Mixtures of alkyl groups Y' can be used. Other groups may be present, for example haloalkyl groups such as chloropropyl, acyloxyalkyl or alkoxyalkyl groups or aromatic groups such as phenyl bonded direct to Si.

The organopolysiloxane material (A) may be made by any suitable method, but preferably is made by hydrosilylation reaction between a siloxane polymer having a number of silicon-bonded hydrogen atoms with the appropriate amount of X"—Ph molecules, wherein X" is as described for X, but has aliphatic unsaturation in the terminal group, allowing addition reaction with the silicon-bonded hydrogen atoms of the siloxane polymer. Examples of suitable X"—Ph materials include styrene, α-methyl styrene (which introduces 2-phenylpropyl groups), eugenol, allylbenzene, allyl phenyl ether, 2-allylphenol, 2- or 4-chlorostyrene, 3- or 4-methylstyrene, 4-t-butylstyrene, 2,4- or 2,5-dimethylstyrene or 2,4,6-trimethylstyrene. α-methyl styrene introduces 2-phenylpropyl groups, which are believed to be mainly 2-phenyl-l-propyl groups but may include 2-phenyl-2-propyl groups. Mixtures of X"—Ph materials can be used, for example styrene with α-methyl styrene. Such hydrosilylation reaction is preferably carried out under the conditions, including the presence of suitable catalysts, described in U.S. Pat. No. 4,741,861.

The organopolysiloxane material (A) may be a substantially linear siloxane polymer or may have some branching. The branching may be in the siloxane chain, brought about e.g. by the presence of some tri-functional siloxane units of the formula $ZSiO_{3/2}$ where $_z$ denotes a hydrocarbon, hydroxyl or hydrocarbonoxy group. Alternatively branching may be caused by a multivalent, e.g. divalent or trivalent, organic or silicon-organic moiety linking polymer chains. The organic moiety can be a divalent linking group of the formula —X'—, and the silicon-organic moiety can be a divalent linking group of the formula X'—Sx—X', where X' denotes a divalent organic group bonded to silicon through a carbon atom and Sx is an organosiloxane group. Examples of organic linking (branching) units are $C_{2-6}$ alkylene groups, e.g. dimethylene or hexylene, or —X'—Ar—X'—, where Ar denotes phenylene. Hexylene units can be introduced by reaction of 1,5-hexadiene with Si—H groups and —X'—Ar—X'— units by reaction of divinyl benzene or diisopropylbenzene. Examples of silicon-organic linking units are those of the formula —$(CH_2)_d$—$(Si(CH_3)_2$—O)$_e$—$Si(CH3)2$-$(CH_2)_d$— wherein d has a value of 2 to 6 and e has a value of 1 to 10; for example linking units where d=2 and e=1 can be introduced by reaction of divinyltetramethyldisiloxane with Si—H groups.

After the hydrosilylation reaction with the aromatic compound X"—Ph and any required reaction with a branching agent, the residual Si—H groups of the organopolysiloxane can be reacted with an alkene such as ethylene, propylene, isobutylene or 1-hexene, preferably in the presence of a hydrosilylation catalyst, to introduce the groups Y'.

It is preferred that the number of siloxane units (DP or degree of polymerisation) in the average molecule of material (A) is at least 5, more preferably from 10 to 5000. Particularly preferred are materials (A) with a DP of from 20 to 1000, more preferably 20 to 200. The end groups of the organopolysiloxane (A) can be any of those conventionally present in siloxanes, for example trimethylsilyl end groups.

The water-insoluble organic fluid (B) may be a single liquid or it may be a mixture of one or more such liquids. It preferably has an aromatic content of less than 10% by weight. It is particularly preferred that the organic fluid (B) is miscible with organopolysiloxane (A) at the operating temperature of the foam control agent and preferably also at 25° C. It has to be a liquid material at the operating temperature of the foam control agent, which may be as high as 40° C. or even 95° C. For many uses, the organic fluid is preferably liquid at 25° C. Preferred organic liquids include oils, e.g. mineral oils, especially hydrogenated mineral oil or white oil, liquid polyisobutene, isoparaffinic oils and vegetable oils, for example peanut oil, coconut oil, olive oil, cottonseed oil and linseed oil. Further examples of suitable organic liquids include polyoxypropylene glycols, polyoxybutylene glycols, esters of carboxylic acids such as dioctyl phthalate, diethyl succinate, methyl caproate, butyl pelargonate, ethyl stearate, dodecyl laurate or methyl melissate and monohydric alcohols such as decanol. Examples of organic fluids which are not liquid at 25° C. but are liquid at higher temperatures include petroleum jelly or Vaseline®, higher alcohols and higher carboxylic acids such as myristic acid.

The weight ratio of organopolysiloxane material (A) to fluid (B) can for example be 90/10 to 10/90, preferably 70/30 to 20/80, more preferably 50/50 to 25/75.

The organosilicon resin (C) is generally a non-linear siloxane resin and preferably consists of siloxane units of the formula $R'_aSiO_{4-a/2}$ wherein R' denotes a hydroxyl, hydrocarbon or hydrocarbonoxy group, and wherein a has an average value of from 0.5 to 2.4. It preferably consists of monovalent trihydrocarbonsiloxy (M) groups of the formula $R''_3SiO_{1/2}$ and tetrafunctional (Q) groups $SiO_{4/2}$ wherein R'' denotes a monovalent hydrocarbon group. The number ratio of M groups to Q groups is preferably in the range 0.4:1 to 2.5:1 (equivalent to a value of a in the formula $R'_aSiO_{4-a/2}$ of 0.86 to 2.15), more preferably 0.4:1 to 1.1:1 and most preferably 0.5:1 to 0.8:1 (equivalent to a=1.0 to a=1.33). The organosilicon resin (C) is preferably a solid at room temperature but MQ resins having a M/Q ratio higher than 1.2, which are generally liquids, can be used successfully. For industrial foam control applications such as defoaming of black liquor in the paper and pulp industry, resins having a high M/Q ratio may be preferred. Although it is most preferred that the resinous compound (C) consists only of monovalent and tetravalent siloxy units as defined above, a resin comprising M groups, trivalent $R''SiO_{3/2}$ (T) units and Q units can alternatively be used. It is also acceptable that up to 20% of all units present can be divalent units $R''_2SiO_{2/2}$. The group R'' is preferably an alkyl group having 1 to 6 carbon atoms, for example methyl or ethyl, or can be phenyl. It is particularly preferred that at least 80%, most preferably substantially all, R'' groups present are methyl groups. Other hydrocarbon groups may be present, e.g. alkenyl groups present for example as dimethylvinylsilyl units, preferably not exceeding 5% of all R'' groups. Silicon bonded hydroxyl groups and/or alkoxy, e.g. methoxy groups may also be present.

Such organosilicon resins are well known. They can be made in solvent or in situ, e.g. by hydrolysis of certain silane materials. Particularly preferred is the hydrolysis and condensation in the presence of a solvent e.g. xylene of a precursor of the tetravalent siloxy unit (e.g. tetraorthosilicate, tetraethyl orthosilicate, polyethyl silicate or sodium silicate) and a precursor of mono-valent trialkylsiloxy units (e.g. trimethylchlorosilane, trimethylethoxysilane, hexamethyldisiloxane or hexamethyldisilazane). The resulting MQ resin can if desired be further trimethylsilylated to react out residual Si—OH groups or can be heated in the presence of a base to cause self-condensation of the resin by elimination of Si—OH groups.

The organosilicon resin (C) is preferably present in the antifoam at 1–50% by weight based on organopolysiloxane (A), particularly 2–30% and most preferably 4–15%.

The organosilicon resin (C) is generally insoluble in the organic liquid (B) but may be soluble or insoluble in the organopolysiloxane material (A) and may be soluble or insoluble in the mixture of (A) and (B). Solubility can be measured by observing a mixture of (C) with (A) and/or (B) using an optical microscope. Enhanced foam control has been achieved both by compositions containing dispersed particles of organosilicon resin (C) and by compositions containing dissolved resin (C). The factors affecting the solubility of (C) in (A) include the proportion of X—Ph groups in (A) (more X—Ph groups increase solubility), the degree of branching in (A), the nature of the groups Y and Y' in (A) (long chain alkyl groups decrease solubility), the ratio of M to Q units in MQ resin (C) (higher ratio of M to Q groups increases solubility) and the molecular weight of (C). The solubility of (C) in (A) at room temperature can thus be from 0.01% by weight or less, up to 15% or more. Increasing proportions of water-insoluble organic liquid (B) may decrease the solubility of (C) in the mixture of (A) and (B). For example a resin (C) of M/Q ratio 0.65:1 which is soluble at a level of at least 5% by weight in an organopolysiloxane (A) containing 20 mole % methyl 2-phenylpropyl siloxane units has reduced solubility when that organopolysiloxane is mixed with more than 10% of a mineral oil of viscosity 60–70 cps at 25° C., decreasing further as the proportion of mineral oil increases. It may be advantageous to use both a resin (C) which is soluble in (A) and a resin (C) which is insoluble in (A). If the resin (C) is insoluble in the mixture of (A) and (B), the average particle size of (C), as measured when dispersed in material (A) and fluid (B), may for example be from 0.5 to 400 μm, preferably 2 to 50 μm.

The resin (C) can be added into the foam control agent as a solution in a non-volatile solvent, for example an alcohol such as dodecanol or 2-butyl-octanol or an ester such as octyl stearate. A resin solution prepared in a volatile solvent such as xylene can be mixed with the non-volatile solvent and the volatile solvent removed by stripping or other form of separation. In most cases the non-volatile solvent can be left in the foam control agent. It is preferred that the resin (C) is dissolved in an equal amount of non-volatile solvent or less, preferably no more than half its weight of solvent. If the resin (C) is added as a solution and is insoluble in the mixture of organopolysiloxane (A) and organic liquid (B), it will generally form solid particles of acceptable particle size on mixing.

The resin (C) can alternatively be added into the foam control agent in the form of solid particles, for example spray dried particles. Spray dried MQ resins are available commercially, for example of average particle size 10 to 200 microns.

The level of insolubility of compound (C) in the mixture of organopolysiloxane material (A) and liquid (B) may affect its particle size in the composition. The lower the solubility of the siloxane resins in organopolysiloxane (A) and organic liquid (B), the larger the particle size tends to be when the resin is mixed as a solution into (A) and (B). Thus a siloxane resin which is soluble at 1% by weight in organopolysiloxane material (A). and organic fluid (B) will tend to form smaller particles than a resin which is only soluble at 0.01% by weight. Organosilicon resins (C) which are partly soluble in the mixture of organopolysiloxane material (A) and organic liquid (B), that is having a solubility of at least 0.1% by weight, are preferred.

The molecular weight of the resin (C) can be increased by condensation, for example by heating in the presence of a base. The base can for example be an aqueous or alcoholic solution of potassium hydroxide or sodium hydroxide, e.g. a solution in methanol or propanol. The MQ resins of increased molecular weight have improved resistance to loss of performance over time when stored in contact with the detergent, for example as an emulsion in liquid detergent. The reaction between resin and base may be carried out in the presence of the silica, in which case there may be some reaction between the resin and the silica. The reaction with base can be carried out in the presence of the organopolysiloxane (A) and/or in the presence of the non-volatile solvent and/or in the presence of a volatile solvent. The reaction with base may hydrolyse an ester non-volatile solvent such as octyl stearate but we have found that this does not detract from the foam control performance.

Hydrophobic fillers for foam control agents are well known and may be materials such as silica, preferably with a surface area as measured by BET measurement of at least 50 m²/g., titania, ground quartz, alumina, an aluminosilicate, an organic waxes e.g. polyethylene wax or microcrystalline wax, zinc oxide, magnesium oxide, a salt of an aliphatic carboxylic acids, a reaction product of an isocyanate with an amine, e.g. cyclohexylamine, or an alkyl amide such as ethylenebisstearamide or methylenebisstearamide. Mixtures of two or more of these can be used.

Some of the fillers mentioned above are not hydrophobic in nature, but can be used if made hydrophobic. This could be done either in situ (i.e. when dispersed in the organopolysiloxane material (A) and/or in organic fluid (B)), or by pre-treatment of the filler prior to mixing with material (A) or fluid (B). A preferred filler (D) is silica which is made hydrophobic. This can be done e.g. by treatment with a fatty acid, but is preferably done by the use of methyl substituted organosilicon materials. Suitable hydrophobing agents include polydimethylsiloxanes, dimethylsiloxane polymers which are end-blocked with silanol or silicon-bonded alkoxy groups, hexamethyldisilazane, hexamethyldisiloxane and organosilicon resins consisting of monovalent groups $(CH_3)_3SiO_{1/2}$ and tetravalent groups $SiO_2$ in a ratio of from 0.5/1 to 1.1/1 (MQ resins). Hydrophobing is generally carried out at a temperature of at least 100° C. Similar MQ resins can be used as the organosilicon resin (C) and as the hydrophobing agent for silica filler (D).

Preferred silica materials are those which are prepared by heating, e.g. fumed silica, or precipitation, although other types of silica such as those made by gel formation are also acceptable. The silica filler may for example have an average particle size of 0.5 to 50 μm, preferably 2 to 30 and most preferably 5 to 25 μm. Such materials are well known and are commercially available, both in hydrophilic form and in hydrophobic form.

The amount of filler (D) in the foam control agent of the invention is preferably 0.5–50% by weight based on organopolysiloxane material (A), more preferably from 1 up to 10 or 15% and most preferably 2 to 8%. It is also preferred that the ratio of the weight of organosilicon resin (C) to filler (D) is from 1/10 to 20/1, preferably 1/5 to 10/1, most preferably 1/2 to 6/1.

The foam control agents according to the invention may be made in any convenient way, but preferably are provided by mixing the different ingredients under shear. The amount of shear is preferably sufficient to provide good dispersion of components (C) and (D) in material (A) and fluid (B), but not so much that the particles (C) and/or (D) would be broken, thus possibly making them less effective, or re-exposing surfaces which are not hydrophobic. Where the filler (D) needs to be made hydrophobic in situ, the manufacturing process would include a heating stage, preferably under reduced pressure, in which the filler and the treating agent are mixed together in part or all of organopolysiloxane material (A) and/or all or part of fluid (B), possibly in the presence of a suitable catalyst, where required.

The foam control agents according to the present invention may be provided as a simple mixture of (A), (B), (C) and (D), but for some applications it may be preferred to make them available in alternative forms. For example for use in aqueous media, it may be appropriate to provide the foam control agent in an emulsion form, preferably an oil-in-water emulsion.

Methods of providing silicone-based foam control agents in oil-in-water emulsion form are known and have been described in a number of publications and patent specifications. Examples are EP913,187, EP0879,628, WO98-22, 196, WO98-00216, GB2,315,757, EP499,364 and EP459, 512. Emulsions may be made according to any of the known techniques, and may be macro-emulsions or micro-emulsions.

In general, they comprise the foam control agent as the disperse phase, one or more surfactants, water and standard additives, such as preservatives, viscosity modifiers and thickeners. The surfactants may be selected from anionic, cationic, nonionic or amphoteric materials. Mixtures of one or more of these may also be used. Suitable anionic organic surfactants include alkali metal soaps of higher fatty acids, alkyl aryl sulphonates, for example sodium dodecyl benzene sulphonate, long chain (fatty) alcohol sulphates, olefin sulphates and sulphonates, sulphated monoglycerides, sulphated esters, sulphonated or sulphated ethoxylate alcohols, sulphosuccinates, alkane sulphonates, phosphate esters, alkyl isethionates, alkyl taurates and/or alkyl sarcosinates. Suitable cationic organic surfactants include alkylamine salts, quaternary ammonium salts, sulphonium salts and phosphonium salts. Suitable nonionic surfactants include silicones such as those described as Surfactants 1–6 in EP 638346, particularly siloxane polyoxyalkylene copolymers, condensates of ethylene oxide with a long chain (fatty) alcohol or (fatty) acid, for example $C_{14-15}$ alcohol, condensed with 7 moles of ethylene oxide (Dobanol® 45-7), condensates of ethylene oxide with an amine or an amide, condensation products of ethylene and propylene oxides, fatty acid alkylol amides, fatty amine oxides, esters of sucrose, glycerol or sorbitol and fluoro-surfactants. Suitable amphoteric organic detergent surfactants include imidazoline compounds, alkylaminoacid salts and betaines. Nonionic or anionic surfactants are preferred. Of particular interest are surfactants which are environmentally acceptable. The concentration of foam control agent in an emulsion may vary according to applications, required viscosity, effectiveness of the foam control agent and addition system, and ranges on average from 5 to 80% by weight, preferably 10 to 50%, more preferably 25 to 40%. A foam control emulsion may also contain a stabilising agent such as a silicone glycol copolymer or a crosslinked organopolysiloxane polymer having at least one polyoxyalkylene group as described in EP 663225.

Alternatively the foam control agent can be provided as a water-dispersible composition in which (A), (B), (C) and (D) are dispersed in a water-dispersible carrier such as a silicone glycol or in another water-miscible liquid such as ethylene glycol, propylene glycol, polypropylene glycol, polyethylene glycol, a copolymer of ethylene glycol and propylene glycol, an alkyl polyglycoside, an alcohol alkoxylate or an alkylphenol alkoxylate.

An alternative form of providing a foam control agent according to the present invention is in powdered form. This is particularly useful when the agent is to be used in a powdered product, e.g. a detergent powder. Many patents have discussed and disclosed methods of providing powdered or granulated foam control agents, for example EP723795, EP718018, EP831145, EP995473, EP997180, EP636685, EP636684, EP336710, WO99/67354, WO00/11126, WO00/11127, WO98/09701, WO95/04124, WO92/20770, WO99/29816, WO96/06921, WO96/06919, WO93/01269, WO92/13056, WO92/22630, WO93/11752, WO96/34671, GB1407997, GB1492939, GB1523957, GB2009223, EP13028, EP40091, EP71481, EP142910, EP206522, EP210721, EP329842, EP414221 and EP 484081. All of these methods can be applied to the foam control agents of the present invention.

Suggested ingredients of particulate foam control agents include, in addition to the foam control agents itself, a binder or encapsulant and a carrier or support for the granule. It is preferred that any carrier or binder material should contribute to the efficiency or activity of the product in which it is to be incorporated. A surfactant may be used to aid dispersion of the silicone and organic liquid in the encapsulant or binder. Sometimes other ingredients are incorporated, for example dyes, pigments, preservatives or materials to aid the dispersion in the aqueous medium in which the foam control agent is supposed to be active such as the surfactants described above in connection with foam control emulsions. Such a surfactant may help in controlling the "foam profile", that is in ensuring that some foam is visible throughout the wash without overfoaming. Granulated foam control agents may be made by a variety of methods, including granulators, spray drying, emulsification followed by drying, spray mixing, spray chilling, compactors, extruders, high shear mixing, low shear mixing and flaking.

Examples of binders and/or encapsulants are polyoxyalkylene polymers such as polyethylene glycol, which can be applied molten or as an aqueous solution and spray dried, reaction products of tallow alcohol and ethylene oxide, or polypropylene glycol, polycarboxylates, for example polyacrylic acid or a partial sodium salt thereof or a copolymer of acrylic acid, for example a copolymer with maleic anhydride, cellulose ethers, particularly water-soluble or water-swellable cellulose ethers such as sodium carboxymethylcellulose, gelatin, agar, microcrystalline waxes, fatty acids or fatty alcohols having 12 to 20 carbon atoms and a melting point in the range 45 to 80° C., a monoester of glycerol and such a fatty acid, a mixture of a water insoluble wax having a melting point in the range from above 55° C. to below 100° C. and a water-insoluble emulsifying agent, glucose or hydrogenated glucose. A binder which is an organic compound having a melting point of from about 40 to 80° C. and which in its liquid form is miscible with the organopolysiloxane (A) so as to form a homogeneous liquid which upon cooling forms a monophasic wax-like substance (that is a material which is homogeneous and shows no phase separation during the process or on storage of the granules) has the advantage of producing encapsulated antifoam granules of improved storage stability.

The surfactant used to disperse the silicone in the binder or encapsulant can be selected from the surfactants described above in connection with foam control emulsions. Silicone glycols are preferred for many binders, or fatty alcohol ether sulphate or linear alkylbenzene sulphonate may be preferred with a polyacrylic acid binder. The surfactant can be added to the silicone undiluted or in emulsion before the silicone is mixed with the binder, or the surfactant and silicone can successively be added to the binder.

Examples of carriers and/or supports are zeolites, for example Zeolite A or Zeolite X, other aluminosilicates or silicates, for example magnesium silicate, phosphates, for example powdered or granular sodium tripolyphosphate, sodium sulphate, sodium carbonate, sodium perborate, a cellulose derivative such as sodium carboxymethylcellulose, granulated starch, clay, sodium citrate, sodium acetate, sodium bicarbonate and native starch.

The foam control agents of the invention can contain additional ingredients such as a density adjuster, a colour preservative such as a maleate or fumarate, e.g. bis(2-methoxy-1-ethyl)maleate or diallyl maleate, an acetylenic alcohol, e.g. methyl butynol, cyclooctadiene, or cyclic methyl vinyl siloxane which reacts with any residual Pt catalyst present, a thickening agent such as carboxymethyl cellulose, polyvinyl alcohol or a hydrophilic or partially hydrophobed fumed silica, or a colouring agent such as a pigment or dye. The foam control agents can contain a spreading agent, for example polydimethylsiloxane or another known silicone antifoam fluid, generally used at less than 20%, preferably up to 5%, by weight based on organopolysiloxane (A). For example a 12500 mPa·s polydimethylsiloxane fluid added at 1% slightly improved the foam reduction for some detergents. If polydimethylsiloxane is present, it can optionally be premixed with a hydrophobic filler, for example hydrophobic silica.

The foam control agents according to this invention are useful for reducing or preventing foam formation in aqueous systems, particularly foam generated by detergent compositions during laundering, and are particularly useful in detergent compositions which have a high foaming characteristic, for example those based on high levels of anionic surfactants, e.g. sodium dodecyl benzene sulphonate to ensure effectiveness of detergent composition at lower washing temperatures, e.g. 40° C.

According to another aspect of the invention a detergent composition comprises (1) 100 parts by weight of a detergent component and (2) from 0.02 to 5 parts by weight of a foam control agent according to the first aspect of the invention.

Suitable detergent components comprise an active detergent, organic and inorganic builder salts and other additives and diluents. The active detergent may comprise organic detergent surfactants of the anionic, cationic, non-ionic or amphoteric type, or mixtures thereof. Suitable anionic organic detergent surfactants are alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated esters, sulphonated or sulphated ethoxylated alcohols, sulphosuccinates, alkane sulphonates, phosphate esters, alkyl isethionates, alkyl taurates and alkyl sarcosinates. Suitable cationic organic detergent surfactants are alkylamine salts, quaternary ammonium salts, sulphonium salts and phosphonium salts. Suitable non-ionic organic surfactants are condensates of ethylene oxide with a long chain (fatty) alcohol or fatty acid, for example $C_{14-15}$ alcohol, condensed with 7 moles of ethylene oxide (Dobanol 45-7), condensates of ethylene oxide with an amine or an amide, condensation products of ethylene and propylene oxides, sucrose esters, fluorosurfactants, fatty acid alkylol amides and fatty amine oxides. Suitable amphoteric organic detergent surfactants are imidazoline compounds, alkylaminoacid salts and betaines. Examples of inorganic components are phosphates and polyphosphates, silicates, such as sodium silicates, carbonates, sulphates, oxygen releasing compounds, such as sodium perborate and other bleaching agents and zeolites. Examples of organic components are anti-redeposition agents such as carboxymethylcellulose (CMC), brighteners, chelating agents, such as ethylene diamine tetraacetic acid (EDTA) and nitrilotriacetic acid (NTA), enzymes and bacteriostats. Liquid detergent compositions may contain solvents, alkanolamines, pH adjusting agents, opacifiers, perfumes, dyes, colour stabilisers, bactericides, brighteners, soil release agents and/or softening agents.

The foam control agents according to the invention are surprisingly much more effective than prior art foam control agents, especially in surfactant compositions which are more prone to produce high levels of foam when agitated. The foam control agents are particularly useful in detergent compositions, but may also be employed in such processes as paper making and pulping processes, textile dyeing processes, cutting oil, coatings and other aqueous systems where surfactants may produce foam.

The following examples illustrate the invention. All parts and percentages are expressed by weight unless otherwise stated.

EXAMPLE 1

A first example foam control agents (FCA1) was prepared by charging to a 1 liter flask equipped with a stirrer 362 g of a siloxane copolymer (A) having a degree of polymerisation of 60 comprising 80 mole % methyl ethyl siloxane units and 20 mole % methyl α-methyl styrene siloxane units, 91 g of a mineral oil (B) of viscosity 60–70 cps at 25° C. and 20 g of treated precipitated silica (D) (Sipernat® D10 supplied by Degussa). 27 g organosilicon resin (C) having trimethyl siloxane units and $SiO_2$ units in a M/Q ratio of 0.65/1 dissolved in octyl stearate (75% solid) was added. The mixture was stirred until complete dispersion of the silica. Then the mixture was homogenised through a high shear mixer.

EXAMPLE 2

A foam control agent (FCA2) was prepared by charging to a 1 liter flask equipped with a stirrer 91 g of the siloxane copolymer of Example 1, 362 g of a mineral oil, 20 g Sipernat D10 silica. 27 g of the organosilicon resin of M/Q ratio 0.65/1, dissolved in octyl stearate (75% solid) were added. The mixture was stirred until complete dispersion of the silica and homogenised through a high shear mixer.

A first comparative example foam control agent (CFCA1) was prepared by charging to a 1 liter flask equipped with a stirrer 453 g of the siloxane copolymer of Example 1 and 20 g Sipernat D10 silica. 27 g of the organosilicon resin having a M/Q ratio of 0.65/1, dissolved in octyl stearate (75% solid) were added. The mixture was stirred until complete dispersion of the silica and homogenised through a high shear mixer.

A second comparative example foam control agent (CFCA2) was prepared by charging to a 1 liter flask equipped with a stirrer 453 g of mineral oil and 20 g Sipernat D10 silica. 27 g of organosilicon resin having trimethyl siloxane units and $SiO_2$ units in a ratio of 0.65/1, dissolved in octyl stearate (75% solid) were added. The mixture was stirred until complete dispersion of the silica and homogenised through a high shear mixer.

Comparative Tests

Example and comparative foam control agents were tested in a powder detergent formulation which comprised 480 g sodium tripolyphosphate, 272 g perborate, 174.4 g sodium dodecyl benzene sulphonate(80% active) and 33.6 g Dobanol® 45/7 nonionic surfactant. The evaluation was made in a front loading washing machine, loaded with 16 cotton towels, 100 g of the detergent formulation, 17 liters of water of 9 degree German hardness.

Each Example and comparative foam control agent was encapsulated by mixing 11.5 g of the foam control agent with 17 g molten ethoxylated fatty alcohol based binder. This heated mixture was sprayed onto 71 g of native starch. 1 g of the encapsulated foam control agent was added to every 100 g of detergent powder and used in a wash cycle of 40° C. (Table 1) or 95° C. (Table 2).

The foam height was measured every 5 minutes during the wash cycle and recorded, where the value indicated is the foam height in the washing machine, with 100% referring to the fact that the window of the machine was full of foam, 50%, that is was half full of foam.

TABLE 1

| Minutes in wash cycle | FCA1 | FCA2 | CFCA1 | CFCA2 |
| --- | --- | --- | --- | --- |
| 0 | 0 | 0 | 0 | 0 |
| 5 | 0 | 0 | 0 | 0 |
| 10 | 0 | 0 | 0 | 0 |
| 15 | 0 | 0 | 0 | 0 |
| 20 | 10 | 20 | 10 | 20 |
| 25 | 20 | 50 | 20 | 60 |
| 30 | 40 | 85 | 20 | 85 |
| 35 | 50 | 85 | 40 | 90 |
| 40 | 60 | 95 | 40 | 95 |
| 45 | 65 | 95 | 50 | 100 |

TABLE 2

| Minutes in wash cycle | FCA1 | FCA2 | CFCA1 | CFCA2 |
| --- | --- | --- | --- | --- |
| 0 | 0 | 0 | 0 | 0 |
| 5 | 0 | 0 | 0 | 5 |
| 10 | 0 | 0 | 0 | 10 |
| 15 | 0 | 0 | 0 | 20 |
| 20 | 0 | 0 | 0 | 30 |
| 25 | 40 | 60 | 0 | 50 |
| 30 | 55 | 70 | 10 | 70 |
| 35 | 60 | 75 | 20 | 75 |
| 40 | 60 | 80 | 20 | 85 |
| 45 | 60 | 95 | 40 | 100 |
| 50 | 65 | 100 | 40 | 100 |
| 55 | 70 | 100 | 40 | 100 |

It can be seen that the example foam control agents behave comparatively well compared to silicone-based foam control agent, and an improvement is seen when compared to those foam control agents based on organic fluids only.

EXAMPLE 3

39% siloxane copolymer (A) described in Example 1 was mixed with 39% rapeseed oil. 2% "Sipernat D10" silica and 20% of a 60% solution of the organosilicon resin of Example 1 octyl stearate were dispersed in the mixture using a high shear mixer to form a foam control agent.

60 g of the foam control agent was mixed with 10 g of a 28% aqueous anionic surfactant solution and 80 g of a 50% aqueous solution of a polycarboxylate binder polymer to form an emulsion. 85 g of this foam control emulsion was deposited on 80 g zeolite and granulated to an encapsulated antifoam powder FCA3 by mixing in a "Kenwood"® Z-blade mixer for 2 minutes then drying with air at 65° C. as a fluidized bed for 20 minutes.

Wash tests at 40° C. and 95° C. were carried out as described above. The detergent used comprised 60 g sodium tripolyphosphate, 50 g sodium perborate tetrahydrate, 21.8 g linear alkyl benzenesulphonate anionic surfactant and 4.2 g ethoxylated fatty alcohol nonionic surfactant, and 0.85 g of encapsulated antifoam FCA 3 was added. The results are shown in Table 3 below

TABLE 3

| Wash time in minutes | 5 | 10 | 15 | 20 | 25 | 30 | 35 | 40 | 45 |
| --- | --- | --- | --- | --- | --- | --- | --- | --- | --- |
| 45° C. | 0 | 50 | 60 | 70 | 80 | 90 | 90 | 90 | 90 |
| 95° C. | 0 | 40 | 50 | 60 | 50 | 50 | 40 | 50 | 60 |

That which is claimed is:

1. A foam control agent, comprising (A) an organopolysiloxane material having at least one silicon-bonded substituent of the formula X—Ph, wherein X denotes a divalent aliphatic organic group bonded to silicon through a carbon atom and Ph denotes an aromatic group, (B) a water-insoluble non-silicon-containing organic fluid which is a liquid at 25° C., (C) an organosilicon resin and (D) a hydrophobic filler, the foam control agent being free from polydimethylsiloxane or containing less than 20% by weight polydimethylsiloxane based on the organopolysiloxane (A).

2. A foam control agent according to claim 1, wherein Ph denotes a moiety containing at least one aromatic ring —$C_6R_5$, in which each R is independently selected from hydrogen, halogen, hydroxyl, an alkoxy group having 1 to 6 carbon atoms or a monovalent hydrocarbon group having 1 to 12 carbon atoms, or wherein 2 or more R groups together represent a divalent hydrocarbon group.

3. A foam control agent according to claim 1, wherein the material (A) is a polydiorganosiloxane comprising at least 50% polydiorganosiloxane units of the formula

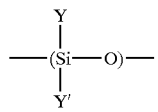

and up to 50% diorganosiloxane units of the formula

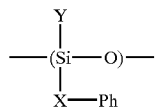

where Y is an alkyl group having 1 to 4 carbon atoms and Y' is an aliphatic hydrocarbon group having 1 to 24 carbon atoms.

4. A foam control agent according to claim 1, wherein the X—Ph group is 2-phenylpropyl.

5. A foam control agent according to claim 1, wherein the organopolysiloxane material (A) further comprises at least one crosslink between siloxane polymer chains selected from the group consisting of crosslinks of the formula —X'— and crosslinks of the formula —X'—Sx—X'—, wherein X' denotes a divalent organic group bonded to silicon through a carbon atom and Sx is an organosiloxane group.

6. A foam control agent according to claim 1, wherein the organic fluid (B) is soluble in organopolysiloxane (A) at 25° C.

7. A foam control agent according to claim 1, wherein the organic fluid (B) is a liquid (measured at 25° C.) selected from the group consisting of mineral oils, isoparaffinic oils, polyisobutene, vegetable oils, poly-oxypropylene glycols, polyoxybutylene glycols, esters of carboxylic acids and monohydric alcohols, and higher alcohols.

8. A foam control agent according to claim 1, wherein the organic fluid is petroleum jelly.

9. A foam control agent according to claims 1 wherein the organosilicon resin (C) is a non-linear silicone consisting of siloxane units of the formula $R'_a SiO_{4-a/2}$ wherein R' denotes a hydroxyl, hydrocarbon or hydrocarbonoxy group, and a wherein a has an average value of from 0.5 to 2.4.

10. A foam control agent according to claim 9, wherein the organosilicon resin (C) is a siloxane resin comprising monovalent trihydrocarbonsiloxy (M) groups of the formula $R''_3 SiO_{1/2}$ and tetrafunctional (Q) groups $SiO_{4/2}$ wherein R'' denotes a monovalent alkyl group and the number ratio of M groups to Q groups is in the range 0.4:1 to 1.1:1.

11. A foam control agent according to claim 1, wherein the organosilicon resin (C) is substantially insoluble in the mixture of organopolysiloxane material (A) and organic fluid (B).

12. A foam control agent according to claim 11, wherein the organosilicon resin (C) has an average particle size as measured when dispersed in material (A) and fluid (B) combined of from 2 to 50 μm.

13. A foam control agent according to claim 1, wherein the organosilicon resin (C) is soluble in the organopolysiloxane material (A).

14. A foam control agent according to claim 1, wherein the hydrophobic filler (D) is selected from the group consisting of silica, titania, ground quartz, alumina, aluminosilicates, polyethylene waxes, microcrystalline waxes, zinc oxide, magnesium oxide, salts of aliphatic carboxylic acids, cyclohexylamine, alkyl amides and $SiO_2$.

15. A foam control agent according to claim 14, wherein filler (D) is a silica filler with an average particle size of from 0.5 to 30 μm.

16. A foam control agent according to claim 1, wherein organosilicon resin (C) is present at 2 to 30% by weight based on organopolysiloxane (A).

17. A foam control agent according to claim 1, wherein hydrophobic filler (D) is present at 1 to 10% by weight based on organopolysiloxane material (A) and organic fluid (B) combined.

18. A foam control agent according to claim 1 which is in the form of an oil-in-water emulsion.

19. A water-dispersible foam control composition comprising a foam control agent according to claim 1 dispersed in a water-dispersible carrier.

20. A foam control agent according to claim 1 which is in particulate form.

21. A foam control agent according to claim 20, wherein the particulate foam control agent further comprises a binder and a carrier.

22. A foam control agent according to claim 21, wherein the binder is selected from the group consisting of polyoxyalkylene polymers, polycarboxylate polymers and cellulose ethers.

23. A foam control agent according to claim 21, wherein the binder is an organic compound having a melting point of from about 40 to 80° C. which in its liquid form is miscible with the organopolysiloxane (A) so as to form a homogeneous liquid which upon cooling forms a monophasic wax-like substance.

24. A foam control agent according to claim 21, wherein the carrier is selected from the group consisting of zeolite, sodium tripolyphosphate, sodium sulphate, sodium perborate or sodium carbonate.

25. A detergent based composition comprising a detergent component and 0.01 to 5% by weight of a foam control agent according to claim 1 based on the detergent component.

26. A detergent based composition containing an organopolysiloxane material to control foam, a water-insoluble non-silicon-containing organic fluid which is liquid at 25° C., an organosilicon resin and a hydrophobic filler, wherein the organopolysiloxane material has at least one silicon-bonded substituent of the formula X—Ph, wherein X denotes a divalent aliphatic organic group bonded to silicon through a carbon atom and Ph denotes an aromatic group, the detergent based composition being free from polydimethylsiloxane or containing less than 20% by weight polydimethylsiloxane based on the said organopolysiloxane material having at least one silicon-bonded substituent of the formula X—Ph.

* * * * *